United States Patent [19]

Dorotte

[11] Patent Number: 5,129,070
[45] Date of Patent: Jul. 7, 1992

[54] METHOD OF USING THE MEMORY IN AN INFORMATION PROCESSING SYSTEM OF THE VIRTUAL ADDRESSING TYPE, AND APPARATUS FOR PERFORMING THE METHOD

[75] Inventor: Michel Dorotte, Les Mureaux, France

[73] Assignee: Bull S.A., Paris, France

[21] Appl. No.: 592,036

[22] Filed: Oct. 3, 1990

[30] Foreign Application Priority Data

Oct. 6, 1989 [FR] France ............... 89 13110

[51] Int. Cl.⁵ ............... G06F 12/00; G06F 12/08
[52] U.S. Cl. ............... 395/400; 395/42.5; 364/DIG. 1; 364/DIG. 2
[58] Field of Search ............... 364/200, 900

[56] References Cited

U.S. PATENT DOCUMENTS

| | | | |
|---|---|---|---|
| 3,820,078 | 6/1974 | Curley et al. | 364/200 |
| 4,177,510 | 12/1979 | Appell et al. | 364/200 |
| 4,206,503 | 6/1980 | Woods et al. | 364/200 |
| 4,258,419 | 3/1981 | Blahut et al. | 364/200 |
| 4,297,743 | 10/1981 | Appell et al. | 364/200 |
| 4,363,091 | 12/1982 | Pohlman et al. | 364/200 |
| 4,385,352 | 5/1983 | Bienvenu | 364/200 |
| 4,876,639 | 10/1989 | Mensch, Jr. | 364/200 |
| 4,970,639 | 11/1990 | Diefendorf et al. | 364/200 |

FOREIGN PATENT DOCUMENTS

| | | |
|---|---|---|
| 0208429 | 1/1987 | European Pat. Off. |
| 0230354 | 7/1987 | European Pat. Off. |
| 2046834 | 9/1973 | Fed. Rep. of Germany |

OTHER PUBLICATIONS

Heller et al., "Memory Protection Moves onto 16-Bit Microprocessor Chip", Electronics International, vol. 55, No. 4, Feb. 1982, pp. 133–137, N.Y.

Primary Examiner—Joseph A. Popek
Assistant Examiner—Michael A. Whitefield
Attorney, Agent, or Firm—Kerkam, Stowell, Kondracki & Clarke

[57] ABSTRACT

The method and apparatus for using the memory in an information processing system of the virtual addressing type is characterized in that a first memory domain DX is organized around a logical address of NX bits in size. In the memory domain DX, a plurality of address spaces EAX of identical structure is defined and relative addressing of a size NL less than NX is allowed. One of the address spaces EAX (hereinafter the current address space EAC) is assigned temporarily and interchangeably to a second memory domain DL organized around an address that is NL bits in size.

11 Claims, 13 Drawing Sheets

FIG_1

FIG_2

FIG_3

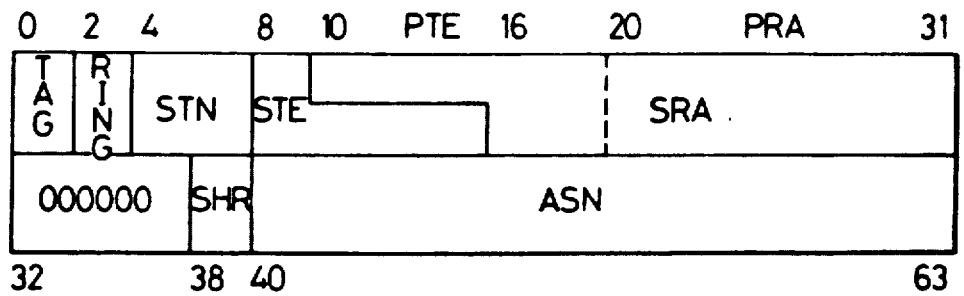
FIG_6
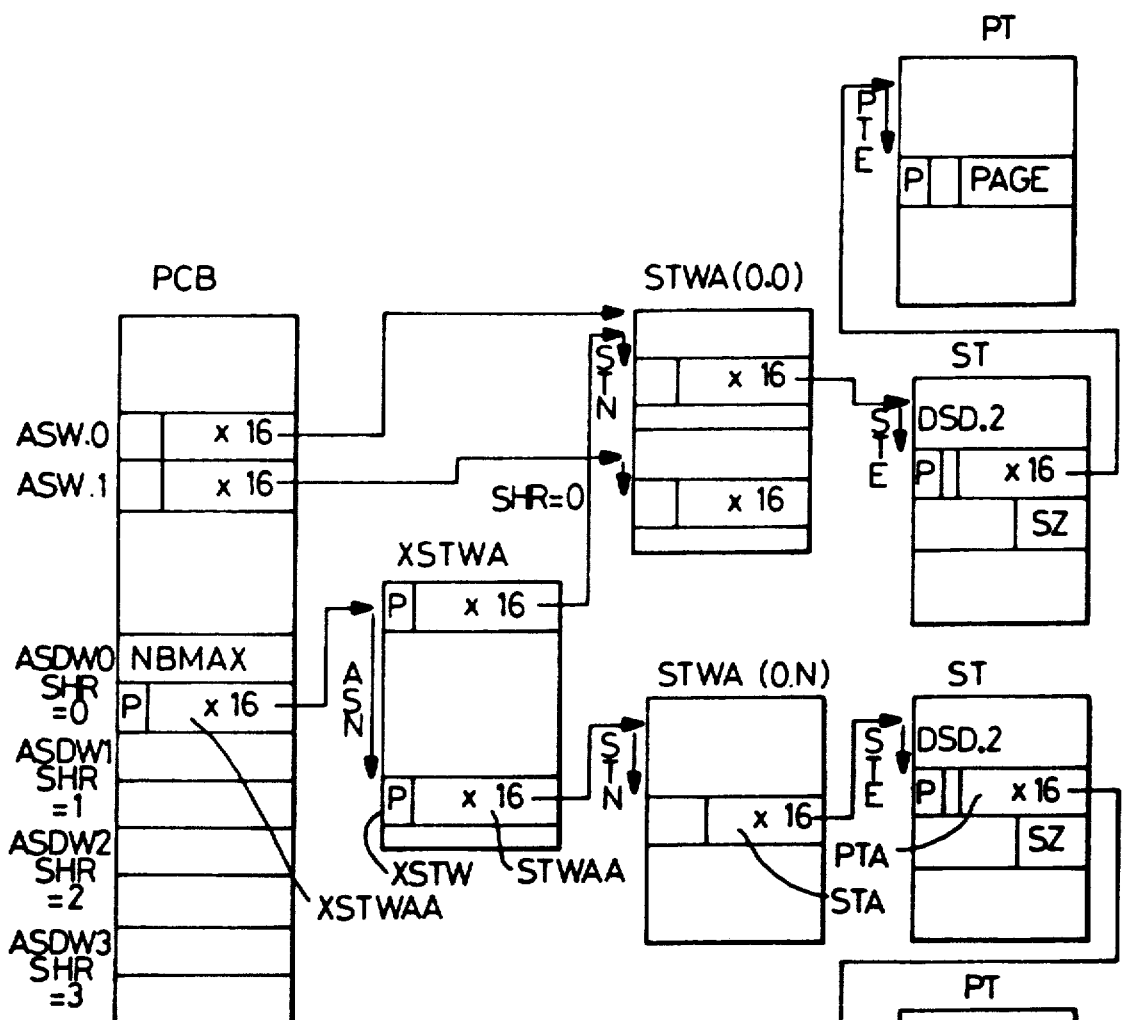
FIG_7

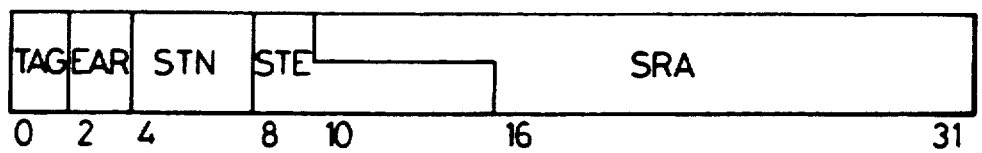
FIG_8
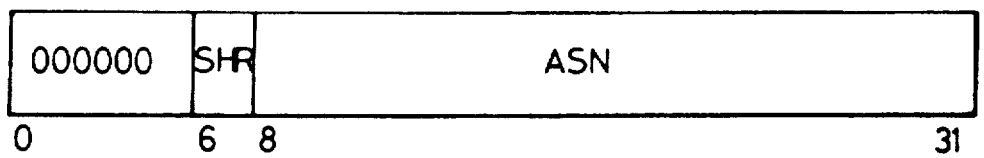
FIG_9
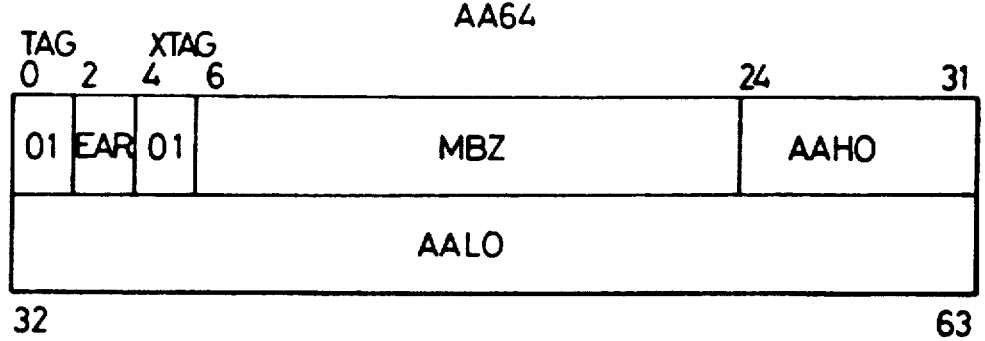
FIG_10

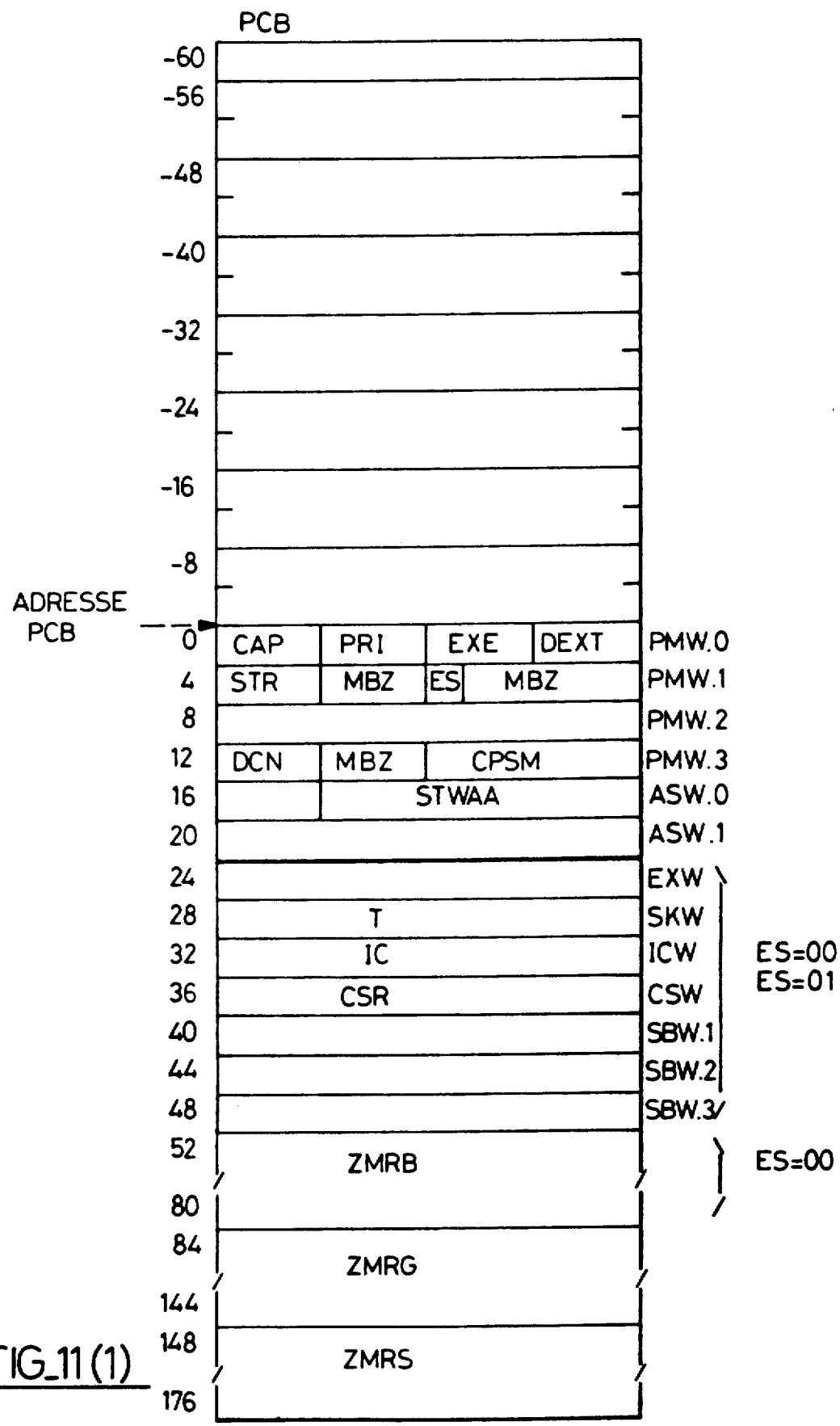
FIG_11(1)

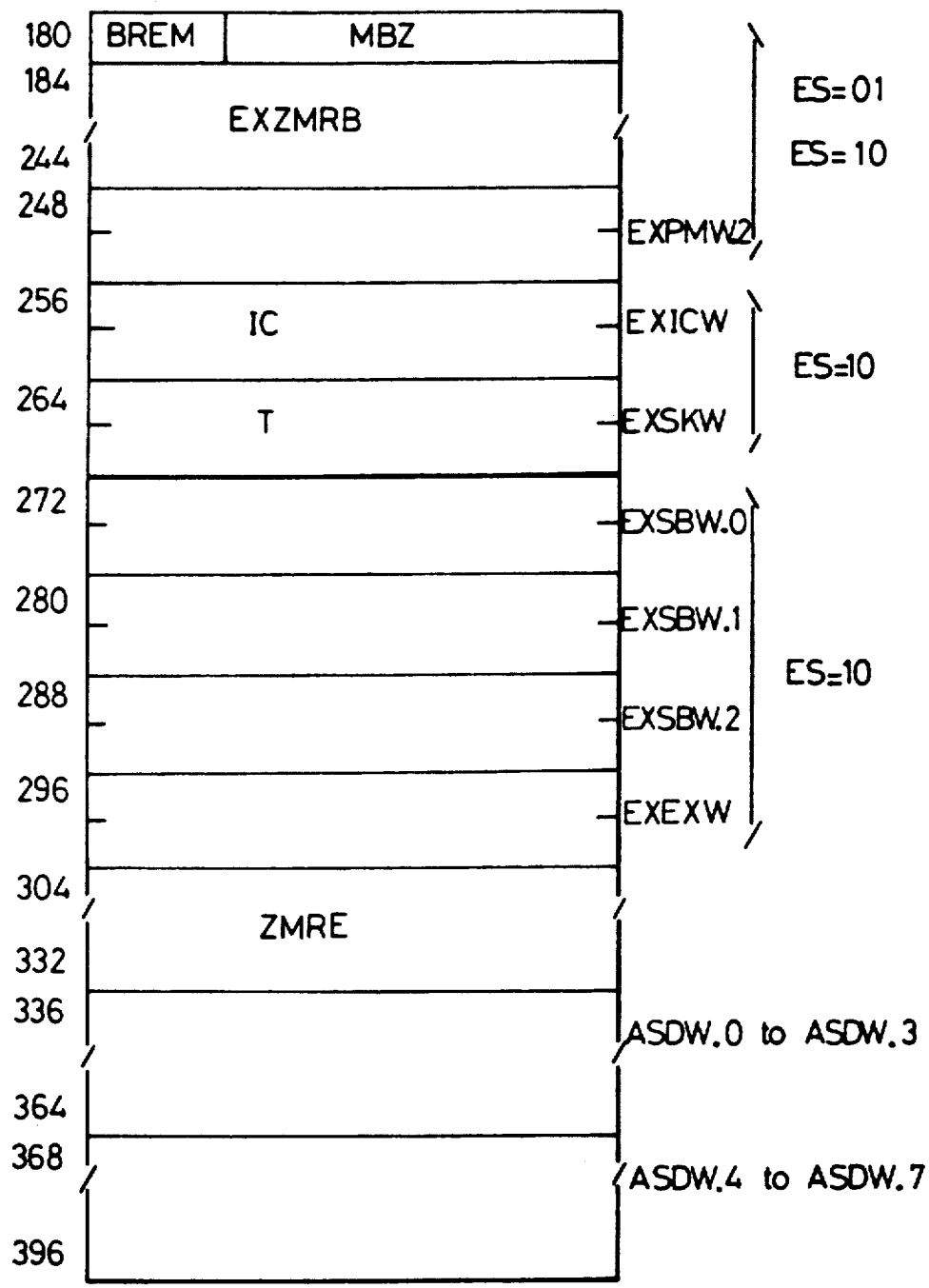
FIG_11(2)

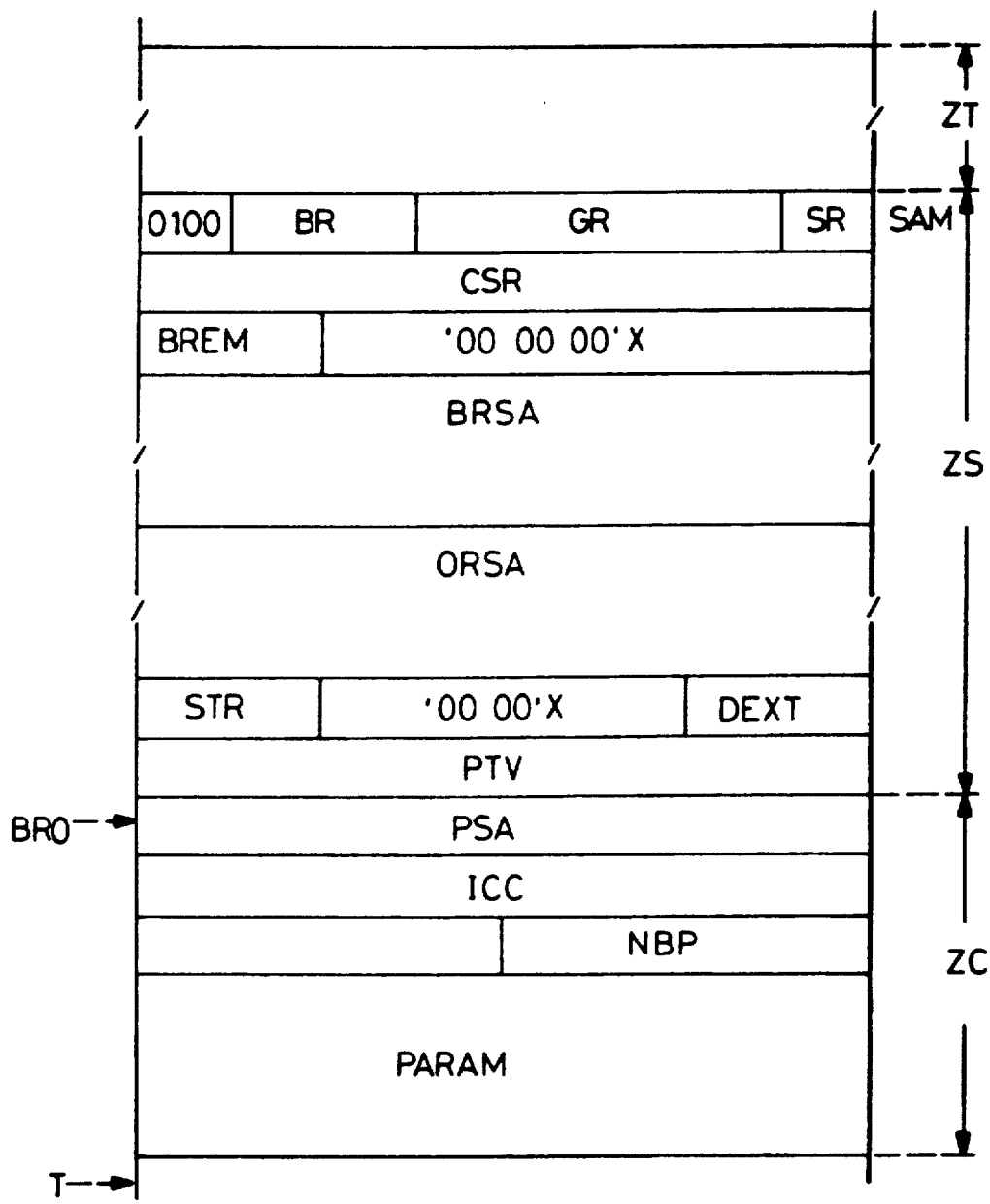
FIG_12

PD 32

| | 0 | 2 | 4 | | 31 |
|---|---|---|---|---|---|
| M.0 | TAG | EPRN | (SEG, SRA) | | |
| M.1 | | | EXPARAM | | |
| | 32 | | 38 | | 63 |

FIG_13

CASD

| | TAG 0 | 2 | 4 | | 31 |
|---|---|---|---|---|---|
| M.0 | 10 | NXM | (SEG, SRA) PDA1 | | |
| M.1 | 000000 | | (SHR, ASN) PDA2 | | |
| | 32 | | 38 | | 63 |

FIG_14

PD64

| | 0 | 2 | 4 | 8 | 10 | 16 | 31 |
|---|---|---|---|---|---|---|---|
| M.0 | TAG | RING | STN | STE | | SRA | |
| | | | XTAG | SHR | XSN | | |
| M.1 | 000000 | | | SHR | ASN | | |
| | XSRA | | | | | | |
| M.2 | EXPARAM1 | | | | | | |
| M.3 | EXPARAM2 | | | | | | |
| | 96 | | | | | | 127 |

FIG_15

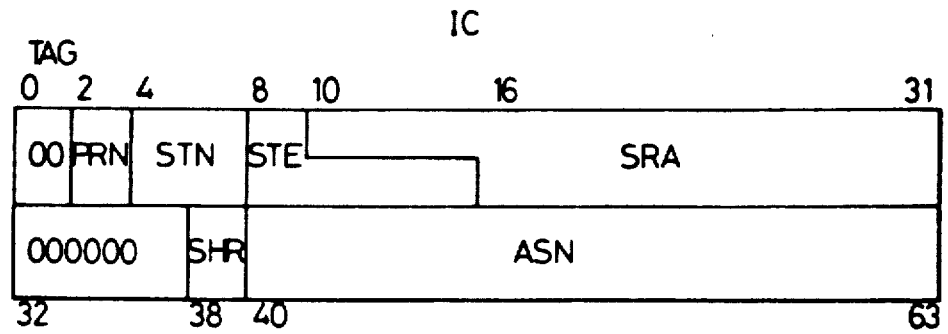
FIG_16
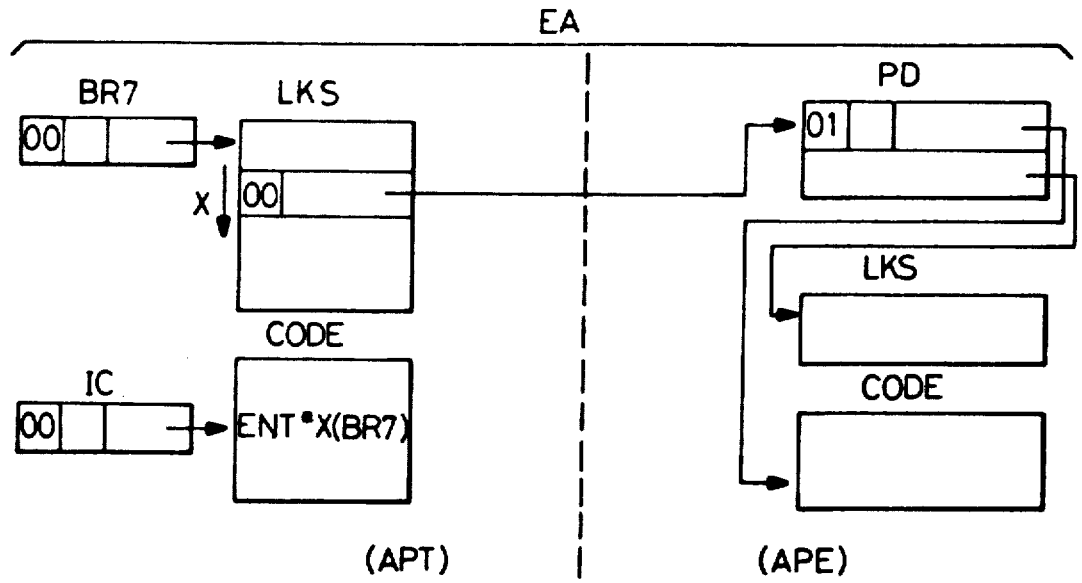
FIG_17

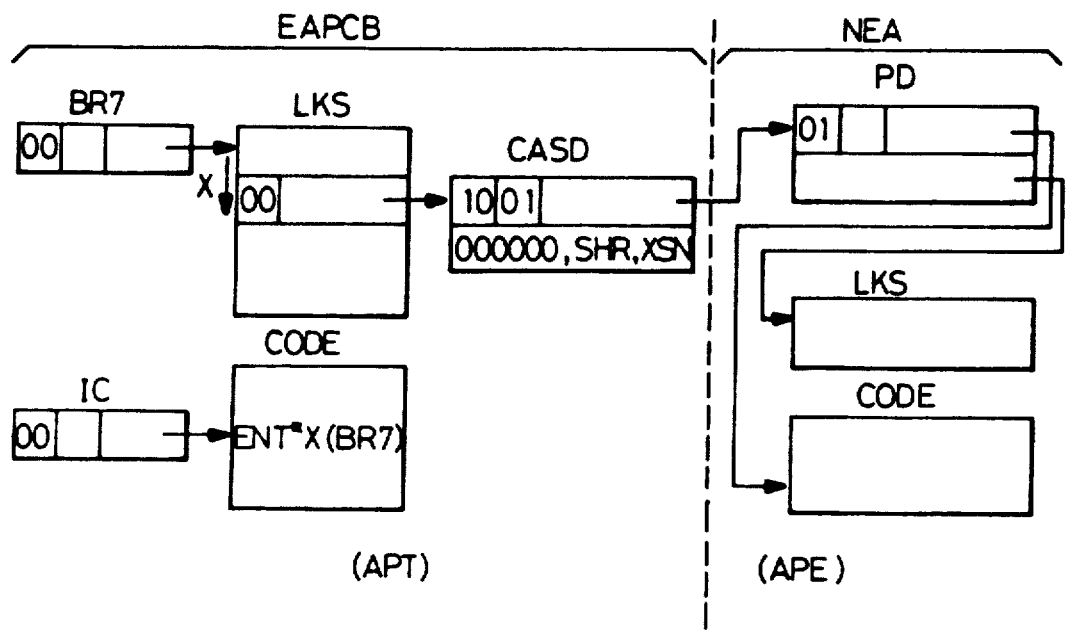
FIG_18
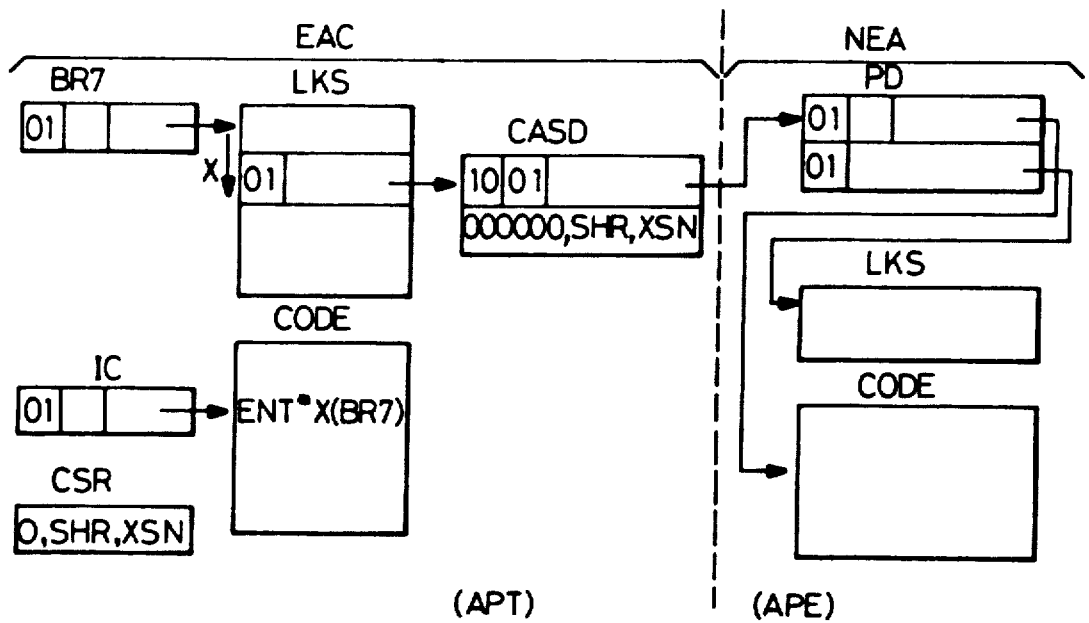
FIG_19

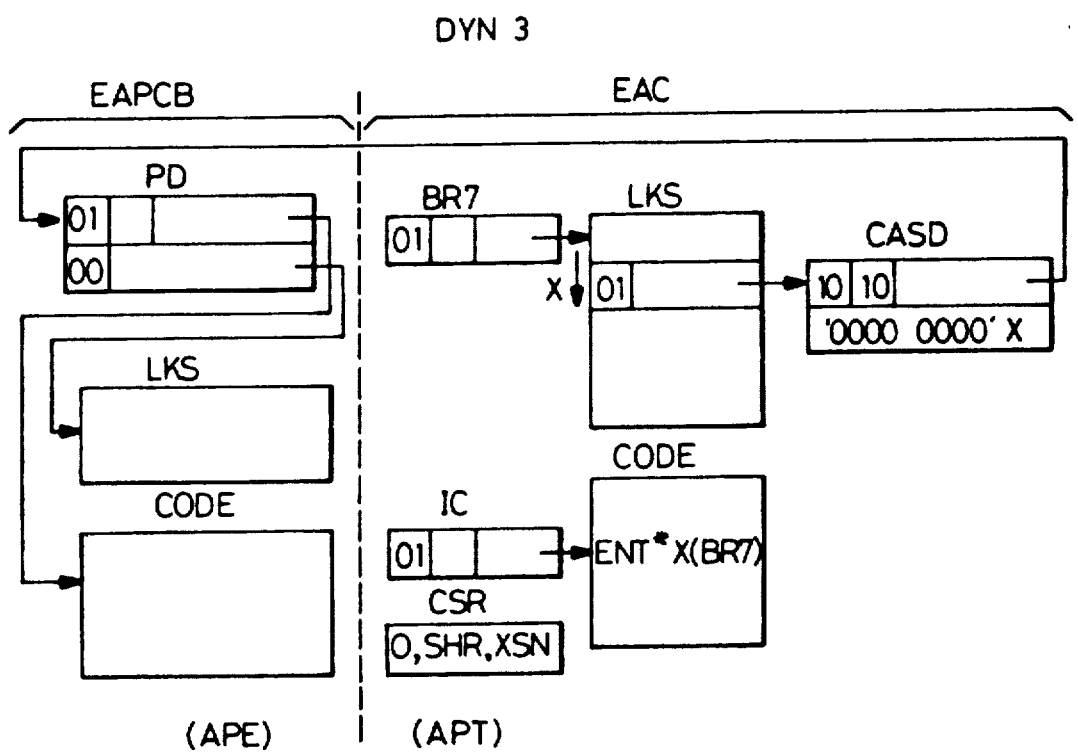
FIG_20

METHOD OF USING THE MEMORY IN AN INFORMATION PROCESSING SYSTEM OF THE VIRTUAL ADDRESSING TYPE, AND APPARATUS FOR PERFORMING THE METHOD

FIELD OF THE INVENTION

The invention relates to a method for using the memory in an information processing system of the virtual addressing type, and an apparatus for performing the method.

BACKGROUND OF THE INVENTION

The known concept of virtual addressing (or virtual memory) makes it possible to offer the system and its users a logical memory capacity much greater than the capacity of the physical memory. In combination with the concept of segmentation, which is also known and makes it possible to divide the virtual memory into zones (called segments) independent of one another, virtual memory has proved to be particularly well adapted to multi-programming and multi-processing.

The frequent significant increase in the capacity of the physical components of the memory of an information processing system (1 MB DRAMs, or dynamic random access memories, are currently available on the market) requires a corresponding expansion of the virtual memories. However, designers of operating systems for information processing systems are confronted with various addressing problems, among which are the following:

- the size of the addressing format becomes inadequate and must be expanded;
- the new, expanded addressing operating system must be compatible with the old one, so that at least for a sufficiently long transition period it will still be possible to run existing user programs designed under the old operating system.

OBJECT AND SUMMARY OF THE INVENTION

The object of the invention is a method for operating a high-capacity virtual memory that meets the need for both compatibility and great user flexibility.

More particularly, the invention proposes an operating method for the memory in an information processing system of the virtual addressing type, characterized in that:

- a first memory domain DX is organized around a logical address of NX bits in size,
- in the memory domain DX, a plurality of address spaces EAX of identical structure and allowing relative addressing NL bits in size, where NL is less than NX, is defined,
- one of the address spaces EAX (hereinafter called current address space EAC) is assigned temporarily and interchangeably to a second memory domain DL organized around an address of NL bits in size.

In a first embodiment of the performance of the method of the invention, an addressing format FX1 of a size NX is constructed to enable access to the spaces EAX by extending a relative addressing format FL of size NL using a complementary zone containing at least one field intended to receive the identifier of the corresponding space EAX.

Thus by temporarily assigning one of the interchangeable address spaces EAX to the domain DL and by special reformatting of the addresses in accordance with the two available address sizes NL and NX (for example 32 and 64 bits), the new memory organization offers the option of using both sizes of address concurrently. The organization of the virtual memory according to the invention is thus highly superior to simple linear extension of memory, which does not afford existing programs any opportunity o profiting from the extension.

In another embodiment for performing the method of the invention, the memory domain DL includes a permanent address space EAPCB, identical in structure to the address spaces EAX; the space EAPCB is markable in the domain DX by an identifier having a value equal to zero.

Advantageously, the address spaces are of the segmented type, optionally with a plurality of sizes and/or sharable by a plurality of processes.

In still another embodiment for performing the method of the invention, a plurality of segments accessible from a different addressing format FX2 of size NX is defined in the memory zone DX.

The performance of the method of the invention demonstrates its full flexibility in the execution of processes by the information processing system. Moreover particularly, in still another variant of the invention:

- for the address spaces of size NL, the spaces EAX and as applicable the space EAPCB, procedure descriptions PD of identical basic structure are selected;
- descriptors of a change of address space (hereinafter CASD), identical in basic structure to that of the procedure descriptors PD, are defined;
- beginning with a process that can be executed in a given address space, the callup of a procedure that can be executed in another address space, via a descriptor of the CASD type, is authorized.

Advantageously, the CASD-type descriptors include a field intended to receive the identifier of the address space containing the called procedure and the pointer of the called procedure in this new address space.

Via the set of callups of procedures in other address spaces, an existing program designed by the addressing mode of limited size DL is thus capable of gaining full benefit of the new capacities of the system. Moreover, these old programs can be contained in full, including the code, in the new address spaces.

The invention also relates to an information processing system including the hardware and software means for performing the method described above, in all its variants. More precisely, the information processing system includes a processor subsystem structured around one or more central processors (CPU) and a central memory; each processor includes microprogrammed means for performing the management of the central memory and input/output controllers IOC operatively connected to peripheral subsystems, particularly of the mass memory type having a sufficient capacity for virtual addressing, and software means, in particular a set of programs grouped under the name of operating system, so that in combination with the microprogrammed means, the method of the invention can be performed.

The invention will now be described in detail, referring to the accompanying drawings.

BRIEF DESCRIPTION OF THE DRAWINGS

FIG. 6 is a schematic representation of the format FX1 of another data descriptor 64K/4MB/ITS64, 64 bits in size, according to the invention;

FIG. 7 is a schematic representation of an address expansion based on the descriptor shown in FIG. 6;

FIG. 8 is a schematic representation of the format FL of the data descriptor 64K/4MB/ITS32, 32 bits in size, used in performing the invention;

FIG. 9 is a schematic representation of the format of the register CSR according to the invention;

FIG. 10 is a schematic representation of the format of an absolute address descriptor AA64, 64 bits in size, in physical memory, according to the invention;

FIG. 11, including FIGS. 11(1) and 11(2), is a schematic representation of a process control block PCB according to the invention;

FIG. 12 is a schematic representation of a stack element according to the invention;

FIG. 13 is a schematic representation of a procedure descriptor PD32 used in the 32 mode and in the 32/64 mode;

FIG. 14 is a schematic representation of a procedure descriptor CASD used in the case of change of address space;

FIG. 15 is a schematic representation of a procedure descriptor PD64 used in the 64 mode;

FIG. 16 is a schematic representation of a particular format of the instruction counter register IC used in the invention;

FIG. 17 is a schematic representation of the basic mechanism of a callup of a procedure of the procedure descriptor type, used in the context of the invention; and FIGS. 18, 19 and 20 are schematic representations of the mechanism of dynamic change of process execution mode, in cases 1, 2 and 3 provided in the invention.

DESCRIPTION OF THE PREFERRED EMBODIMENT

Figure 1:
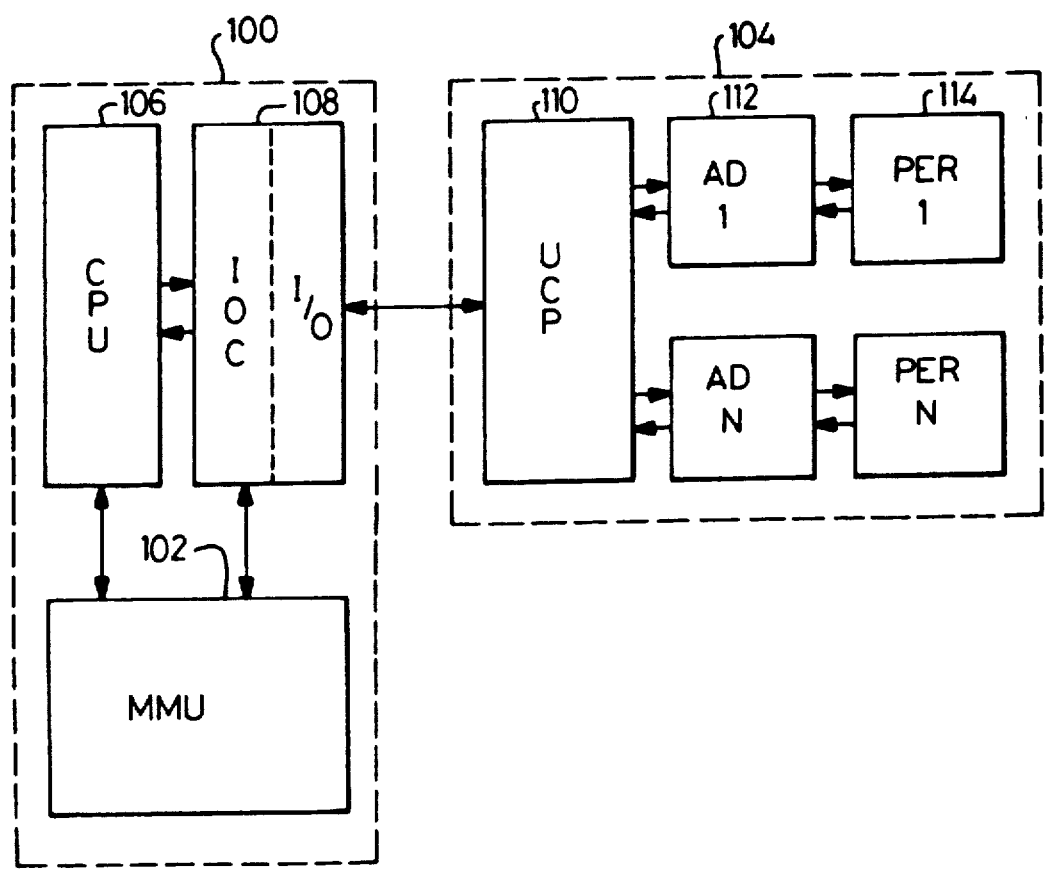
FIG. 1 is a diagram of an information processing system using the method of the invention.

By convention, in the ensuing description the symbol "" will designate the mathematical expression "exponent", for example 210=1024. Similarly, the symbol "< >" will designate the mathematical expression "different from".

In the embodiment of the invention described here by way of non-limiting example, the information processing system has been designed to remain compatible with existing systems that support 32-bit addressing. As a result, the system of the invention incorporates certain hardware and software elements of current systems, to various extents. In order not to overburden the ensuing discussion, it will be centered on the presentation of the invention itself. For further detail, the reader may also refer to the available documentation, and very particularly to U.S. Pat. No. 4,385,352, which relates to an apparatus for address expansion and calculation in a segmented memory, and U.S. Pat. No. 4,297,743, which relates to a procedure calling mechanism and a cooperating stack mechanism for a computer. The subject matter of said patents are hereby incorporated by reference.

At this stage of the discussion, various definitions will also be recalled, as follows:

Process: A process is defined as an ordered sequence of operations defined by instructions that can be executed asynchronously by the central subsystem. Because of this, a plurality of processes may be active and share the resources furnished by the system, but in a given processor only one process is being run at a given instant. A group of processes is a set of associated processes required to execute one operating step, for which specific resources have been temporarily allocated by the system. Each process has a zone in memory, known as the process control block (PCB), in which the information necessary for execution of the process by the system is saved.

Procedure: A procedure is defined as an identifiable set of program instructions suitably linked to be executed within the context of a process. To change from one procedure to another, or to use the various services of the operating system (particularly when using modularly structured programs), a particular mechanism (described in further detail hereinafter) known as a procedure call is used. One of the merits of the invention is that it has retained the efficiency of this call mechanism (which is quite appreciable for the degree of performance of the system), despite the two addressing sizes.

Address space: Memory zone allocated to a process and accessible by it. Most often, the addresses used by a process are logical addresses, rather than absolute addresses in the main memory.

Segmentation of the main memory: To meet the virtual-memory needs of a process, the address space is allocated either statically, at the time the process is designed, or dynamically, during the running of the process, by generally non-contiguous segments of variable sizes. Thus the process has access to its own memory segments or to associated segments by the intermediary of a segment descriptor system that describes the segments. These descriptors are contained in tables managed by the operating system. To minimize the size of the tables in the central memory, segment sharing levels encoded from (0) to (3) have been defined. Regardless of the sharing levels, the system may incorporate a system for ranking various processes, for example a system utilizing the ring concept described in U.S. Pat. No. 4,177,510.

Turning to FIG. 1, the information processing system includes two main subsystems: the central subsystem 100, particularly including the central memory MMU 102, and the peripheral subsystem 104. The central subsystem 100 is structured around central processors (or central processing units) CPU 106 that are connected to input/output controllers IOC 108. Via input/output channels I/O, these controllers 108 communicate with the peripheral subsystem 104 through peripheral control units UCP 110, which in turn are connected via adaptors AD112 to various peripherals PER 114, in particular mass memories (disk memories); active terminals, equipped with screens and keyboards; printers; and data transmission equipment. There may be as many as several hundred peripherals in a complete information processing system.

The central memory MMU 102 comprises a semiconductor microchip network of the dynamic random access type (DRAM), having a maximum total capacity of 1024 gigabytes (1024 GB). Optionally, a cache memory (not shown) is provided for each processor, to shorten the access and transfer time for the most frequently processed information.

Addressing Domain

Figure 2:
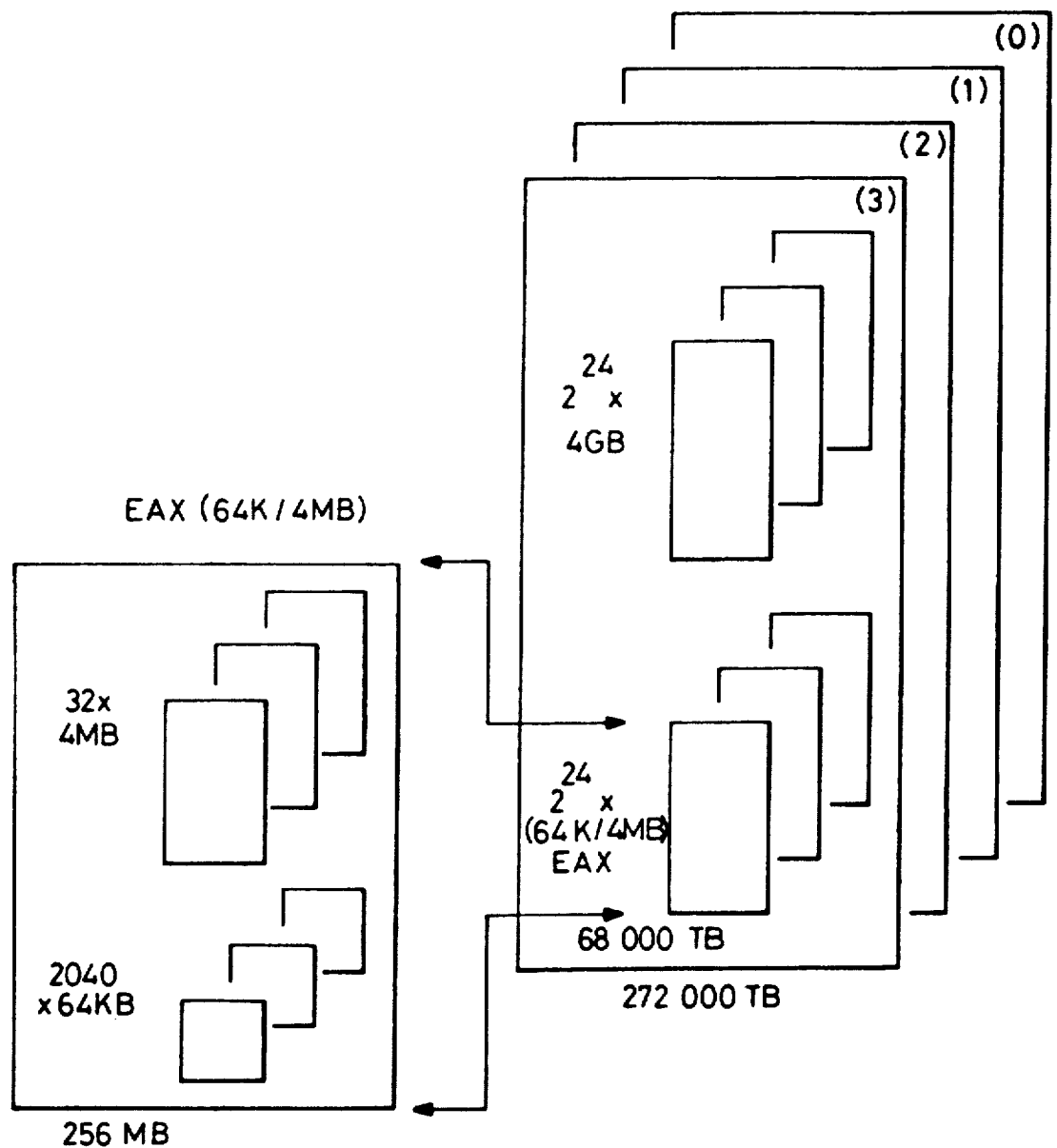
FIG. 2 is a schematic representation of the segmentation of the virtual memory according to the invention.
Figure 3:
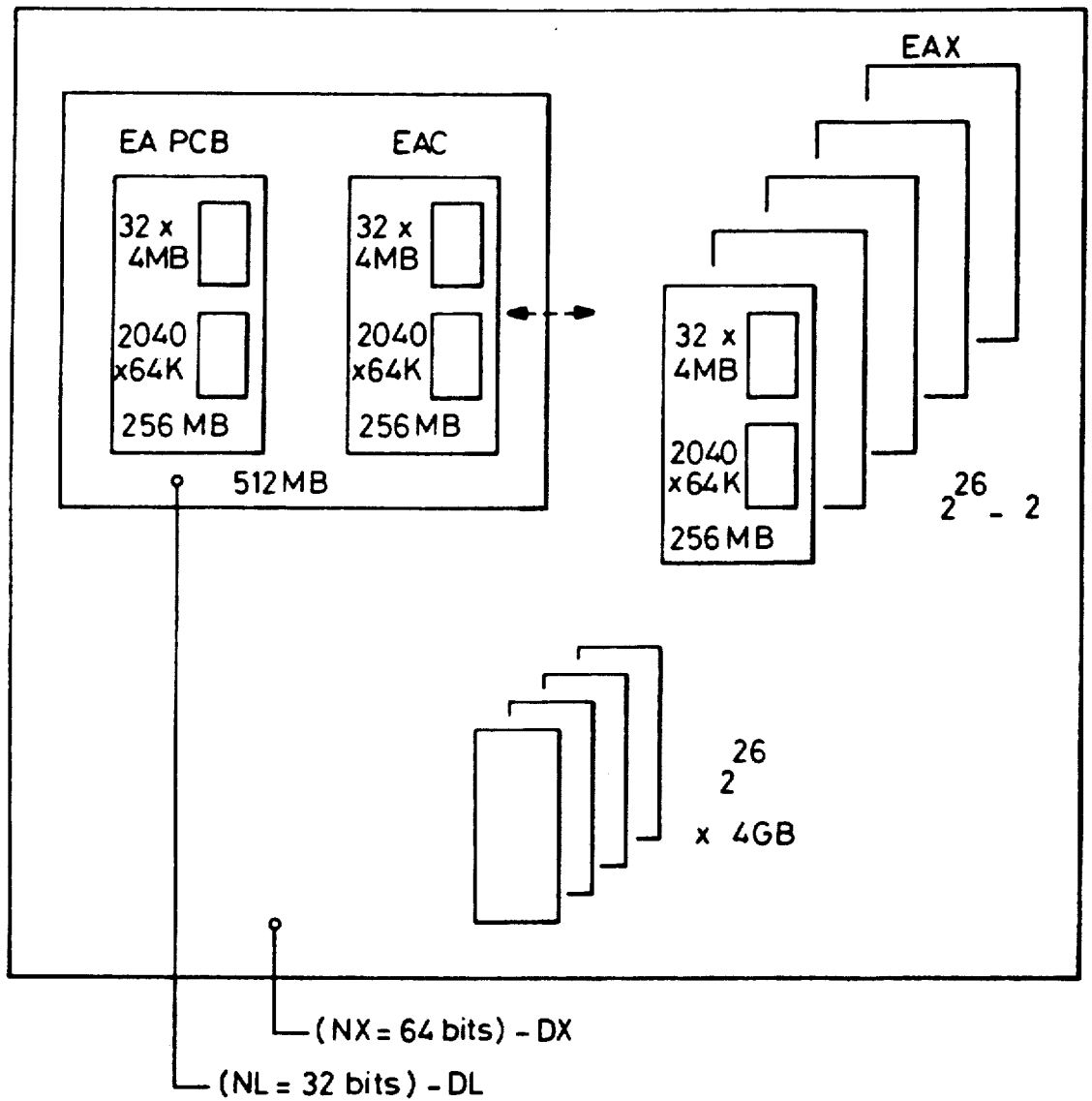
FIG. 3 is a schematic representation of the organization of memory domains into 32 and 64 bits according to the invention.

FIGS. 2 and 3 schematically show the organization of the virtual memory according to the invention.

The main memory is organized in accordance with three types of segments, of increasing size:

64 kilobyte segments, or 2**16 bytes (64 KB)
segments of 4 megabytes or 2**22 bytes (4 MB)
segments of 4 gigabytes or 2**32 bytes (4 GB).

The segments of the first two types are grouped into batches, hereinafter called address spaces 64K/4MB or spaces EAX, having a total of 256 megabytes or 2**28 bytes, and comprising the following:

32 segments of the 4 MB type, and
2040 segments of the 64 KB type.

Finally, the address spaces 64K/4MB and the segments of the 4 GB type are grouped among four stages each having a total capacity of 68,000 terabytes (1 terabyte=2**40 bytes) and comprising the following:

2**24 segments of the 4 GB type and
2**24 address spaces 64K/4MB.

The four stages correspond to the four segment sharing levels, respectively level (0) or "system level", level (1) or "undefined level", level (2) or "process group level", and level (3) or "process level".

The total capacity of the thus-constituted virtual memory is 272,000 terabytes (a capacity of between 258 and 259 bytes). Quite clearly, the resultant memory domain DX requires logical addressing of a compatible size NX. The size NX may be contained in a 64-bit pointer. Similarly, the address spaces EAX of limited memory capacity allow a relative logical addressing, the size NL of which may be contained in a 32-bit word.

The spaces EAX are identifiable by an ordinal number, or more generally by a more sophisticated identifier; in the embodiment of the invention shown here, for example, the identifier (shown in FIG. 9) is constituted primarily by a zone indicating the segment sharing level and by an ordinal number in the corresponding memory stage.

Turning to FIG. 3, it can be seen that within the memory domain DX, a memory domain DL has been defined including one of the EAX address spaces of the 64K/4MB type, assigned temporarily and interchangeably to this domain DL, which allows an address size of 32 bits. This space of the EAX type assigned to the domain DL will hereinafter be called the current address space EAC.

To improve compatability with existing programs designed for 32-bit addressing, a permanent address space or EAPCB space, identical in structure to the spaces 64K/4MB, is assigned to the memory domain DL. In the domain DX, this space EAPCB can be marked by its identifier having a value equal to zero (all the bits of the field reserved for the identifier have the binary value 0). Hence the memory domain DL supporting 32-bit addressing has a capacity of 512 MB.

Figure 4:
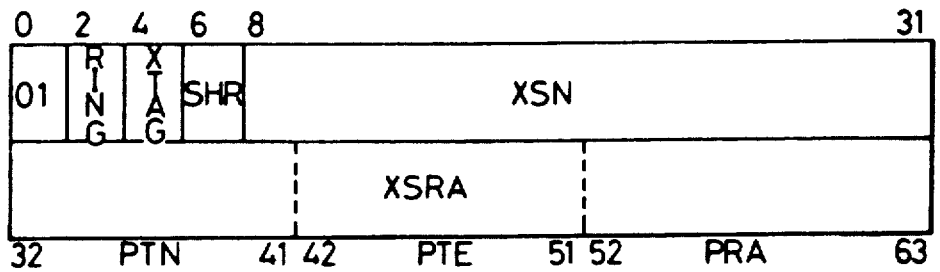
FIG. 4 is a representation of the format FX2 of a first data descriptor 4GB/ITS64, 64 bits in size, according to the invention.

FIGS. 4 and 6 show the two types of format of the data descriptors using 64-bit addressing. Generally, these formats are structured around 32-bit words (numbered from 0 to 31 from left to right), some of them coupled into double 64-bit words (the bits of the second word are then numbered from 32 to 63 from left to right). These formats are equally usable for both data and instructions.

With respect to the data, they are in the binary form but can be interpreted as binary, decimal, floating or alphanumeric. The data bits are interpreted in groups of four when they are encoded in the binary coded decimals, groups of eight for alphanumeric data, groups of 64 or 128 bits for floating data, and groups of 1 to 64 for binary data.

The byte locations in the main memory are numbered consecutively beginning with zero. Each number corresponds to the physical address of the byte. In the example described, a word is formed of 32 bits, or in other words 4 bytes. Also, a group of bytes may be aligned on a half-word, a single word, a double word or a quadruple word, if the address of the leftmost byte of the group is a multiple of 2, 4, 8 or 16, respectively. In this case, one complete group of data bytes may be selected from the memory in a block. The location of the data in the memory is obtained from a descriptor (of the address) of data by an address expansion mechanism described hereinafter.

FIG. 4 illustrates the format FX2 of a data descriptor of 64 bits, corresponding to the largest-sized segments, hence 4 gigabytes. The descriptor 4GB/ITS64 includes two words and is broken down as follows:

a first field formed of the first two bits 0 and 1 and called TAG, which contains the binary value 01;

a second field formed of bits 2 and 3 and called RING, which contains a binary value representing the ranking level associated with the pointer upon access of the data of the addressed segment (ring number);

a third field formed of bits 4 and 5 and called XTAG, which contains a binary value representing the code type of the descriptor. More precisely, XTAG=00 corresponds to direct addressing (the address expansion leads to the object sought);

XTAG=01 corresponds to an absolute addressing in physical memory and is obtained concatenation of the fields XSN and XSRA (this operation will be described hereinafter with reference to FIG. 10);

XTAG=10 corresponds to an indirect addressing (the address expansion leads to a different 64-bit data descriptor which in turn leads directly or indirectly to the object sought);

XTAG=11 corresponds to an error, leading to a special exception procedure;

a fourth field formed of bits 6 and 7 and called SHR, which contains a binary value representing the sharing level, from (0) to (3), of the segment addressed, that is, the memory stage in which the segment is located;

a fifth field formed of bits 8–31 (24 bits in all) and called XSN, which contains a binary value representing the ordinal number of the addressed segment in the corresponding memory stage; and a sixth field formed of bits 32–63 (the second word) and called XSRA, which contains a binary value representing the displacement in the segment (the relative address) of the object to which the process seeks access.

Figure 5:
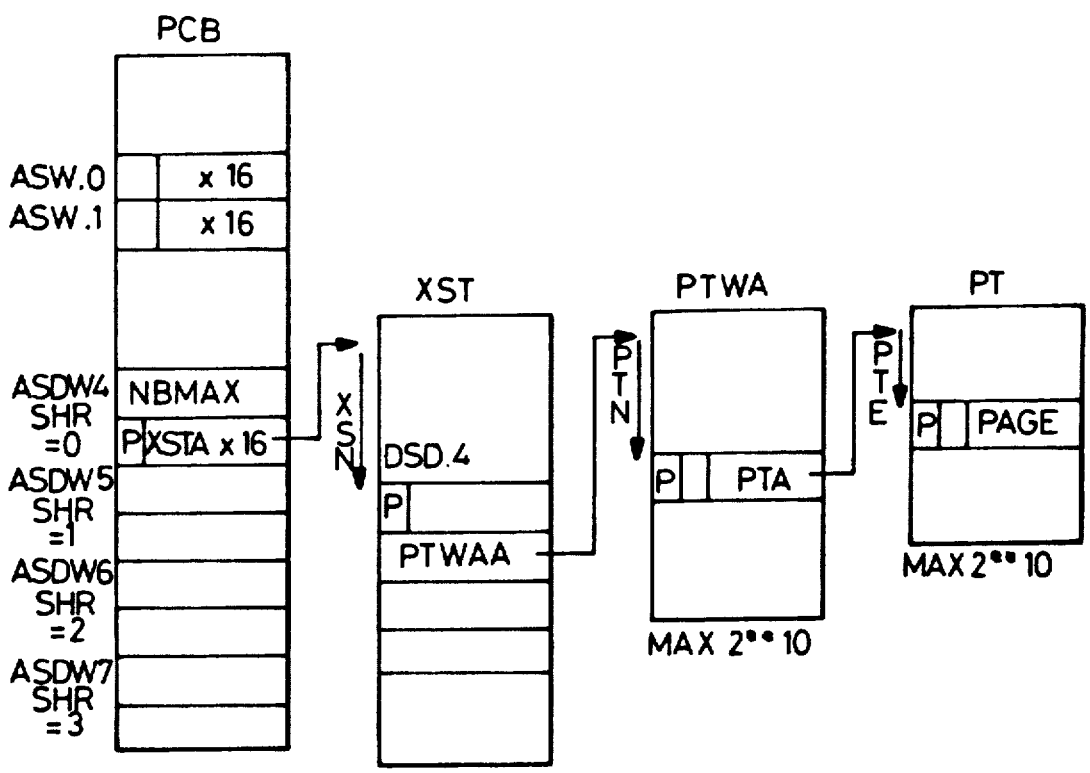
FIG. 5 is a schematic representation of the address expansion based on the descriptor shown in FIG. 4.

The address expansion (shown in FIG. 5) of this descriptor 4GB/ITS64 is performed in the following manner, based on the data contained in specific zones of the memory block PCB (process control block) corresponding to the process seeking access to the 4 GB-type segment addressed. To this end, the block PCB shown in part in FIG. 5 includes four zones having the length of a double word (two words of 32 bits), called ASDW4 (where SHR=0), ASDW5 (where SHR=1), ASDW6 (where SHR=2) and ASDW7 (where SHR=3). The zones ASDW4/7 (double-word address space) are not actually significant except to the extent that the contents of the field P (bit 32, or presence bit) are equal to the unit. This field P indicates the presence in memory of the structure sought, in this case the table of segment descriptors called XST. In the case where this presence bit=0, an exception procedure is initialized in order to load the descriptor list sought into memory.

The zones ASDW4/7 include two other fields, the first called NBMAX (bits 8-31) which defines the number of entries the table XST (a maximum of 2**24), and the second, XSTA (bits 33-63) is a pointer that defines the absolute address as a multiple of 16 of the first entry of the table XST. Hence this absolute address will be obtained by adding four zeroes on the least significant bit side to the value of XSTA. In the ensuing description, the term "entry" will generally designate the first byte of one element of a table, while the term "pointer" will designate a value representative of the absolute address of such an entry. The pointer will often be a fractional multiple of the absolute address.

The contents of the field XSN of the descriptor 4GB/ITS64 are then used for access in the table XST to the double segment descriptor DSD.4 formed of a quadruple word. In addition to the presence bit P (bit 0) and various protection fields, this quadruple word, corresponding to a double direct descriptor, includes an address pointer PTWAA (bits 32-63) giving the absolute address, as a multiple of 16, of the first entry of the page table word array PTWA, and a segment size field (bits 64-87), the value of which plus one unit gives the dimension of the segment, as a multiple of 4096 bytes.

The contents of the field XSRA of the descriptor 4 GB/ITS 64 are then used in part. The field XSRA is in fact divided into three zones (see FIG. 4): a subfield PTN (bits 32-41) corresponding to the number of the page table PT, a subfield PTE (bits 42-51) corresponding to the entry number of the corresponding segment in the page table, and a subfield PRA (bits 52-63) corresponding to the relative address of the structure sought in the page, the size of which is 4 kilobytes, hence 2**12 bytes.

Thus the contents of the subfield PTN give the ordinal number of the entry in the page table word array PTWA (maximum size MAX=210 entries) and enable access to the (32-bit) word sought in the page table. This word also includes the presence bit P, the absolute address PTA of the first entry of the page table PT sought (maximum size MAX=210 entries). The contents of the subfield PTE give the ordinal number of the entries sought in the page table PT and enable access to the page descriptor, and also include the presence bit P, the absolute address of the first byte of the page.

This mechanism, which translates a virtual address (also called a segmented address) into a real address, is generally associated with an acceleration device using an associative memory, making it possible to effect direct correspondence of the real addresses with the virtual addresses when these addresses are later used.

FIG. 6 shows the format FX1 of another 64-bit data descriptor corresponding to the segments incorporated in the spaces 64K/4MB. This descriptor, called 64K/4MB/ITS64, includes two words and is broken down as follows:

the first field, TAG, formed of bits 0 and 1, contains a binary value representing the code type of the descriptor. More particularly, TAG=00 corresponds to direct addressing;

TAG=01 refers to a descriptor of the 4GB/ITS64 type;

TAG=10 corresponds to an indirect addressing; and

TAG=11 corresponds to an error leading to a special exception procedure.

the second field formed of bits 2 and 3 and called RING contains a binary value representing the privilege level associated with the pointer at the time of access to the data of the addressed segment (ring number);

the third field formed of bits 4 through 7 (4 bits), called STN, contains a binary value representing the ordinal number of an entry in the segment table word array STWA;

the fourth and fifth fields, STE and SRA, representing the number of an entry in the segment table ST and of the relative address of the object sought in the segment in question, have two different formats depending on the type of segment addressed. Addressing a segment of the 4 MB type (STE is defined by bits 8 and 9, and SRA is defined by bits 10-31) corresponds to a decimal value for STN of between 0 and 7. Addressing a segment of the 64 KB type (STE is defined by bits 8-15, and SRA is defined by bits 16-31) corresponds to a decimal value of STN of between 8 and 15.

As before, the field SRA includes two subfields, the subfield PTE corresponding to the ordinal number of the entry in the page table (having a length of 10 or 4 bits depending on the segment type) and the subfield PRA (bits 20-31) corresponding to the relative address in the page of the object sought.

The second word of the descriptor 64K/4MB/ITS64 includes the sixth, seventh and eighth fields:

the sixth field (bits 32-37) contains the binary value 0;

the seventh field (bits 38-39), called SHR, contains a binary value representing the sharing level of the segment addressed; and the eighth field (bits 40-63), called ASN, contains the ordinal number enabling identification of the corresponding address space EAX.

The address expansion (shown in FIG. 7) of this descriptor 64K/4MB/ITS64 is performed as follows, beginning with the data contained in the specific zones of the corresponding memory block PCB. For this purpose, the block PCB (shown in part in FIG. 7) includes four zones having the length of one double word called ASDW0 (where SHR=0), ASDW1 (where SHR=1), ASDW2 (where SHR=2), and ASDW3 (where SHR=3). As before, the double address space words ASDW0/3 are not really important except when the contents of the presence bit P (bit 32) equal 1. The zones ASDW0/3 include two other fields, the first called NBMAX (bits 8-31), which defines the number of entries in the main segment table word array XSTWA (maximum 2**24), and the second, XSTWAA (bits 33-63), which is a pointer that defines the absolute address as a multiple of 16 of the first entry of the array XSTWA.

The contents of the field ASN of the descriptor 64K/4MB/ITS64 are then used for access to the corresponding word XSTW, which in addition to the presence bit P includes the field STWAA (pointer) representing the absolute address of the first entry of a segment table word array STWA. The field STN of the descriptor 64K/4MB/ITS64 then enables access to the word containing the field STA (pointer), which defines the absolute address as a multiple of 16 of the first entry of the segment table ST.

The contents of the field STE of the descriptor 64K/4MB/ITS64 are then used for access in the table ST to the double descriptor segment DSD.2 formed of a double word. Aside from the presence bit P (bit 0) and the various protection fields, the double words corresponding to a direct descriptor includes an address pointer PTA (bits 8–31) yielding the absolute address, as a multiple of 16, of the first entry of the corresponding page table PT, and a size field SZ (bits 46–55), the value of which, plus one unit, gives the size of the segment as a multiple of 4096 bytes. The contents of the subfield PTE enable access in the table PT to the page descriptor corresponding to the page sought, and besides the presence bit P also include the pointer PAGE of the absolute address of the first byte of the page sought.

FIG. 7 also shows the segment table word array, represented by STWA(0.0), corresponding to SHR=0 and ASN=0. Access to this particular table, which corresponds to the address space EAPCB, can be made directly, with an appreciable time savings, from a particular zone of the block PCB called the address space word or ASW.0, which is equal in size to a word and includes the pointer of the absolute address of the first entry of the array STWA(0.0). This capability is very valuable for compatability of the system according to the invention with existing programs structured around 32-bit addresses by the format FL shown in FIG. 8. It is then possible to share the data in both address domains, the 32-bit domain (DL) and the 64-bit domain (DX).

Taking into account the identity of the structures used in the 32-bit addressing domain DL (space EAPCB and space EAC) with the structures of the address spaces EAX comprising batches of segments of the 64 KB and 4 MB types, the format of the 32-bit addressing data descriptor, called 64K/4MB/ITS32 shown in FIG. 8 has a structure identical to that of the first word of the descriptor 64K/4 B/ITS64 shown in FIG. 6, on the understanding that the fields RING and EAR are equivalent. An address in the space EAPCB is obtained by TAG =00. Contrarily, TAG=01 leads to an address in the current address space EAC that is identifiable among the spaces EAX. To this end, a special register CSR has been created to memorize the value of the identifier of the space EAC, that is, the identifier of the particular one of the spaces EAX that is then temporarily assigned to the domain DL. This register CSR, the format of which is shown in FIG. 9, has a one-word dimension and is identical to the size of the second word of the descriptor 64K/4MB/ITS64. It is made up of three fields, the first formed of bits 0–5, each containing the binary value 0; the second field, SHR, formed of bits 6 and 7 and containing the value representing the segment sharing level addressed; and the third, ASN, formed of bits 8–31, containing the identification (in fact, the ordinal number in the corresponding memory stage) of the batch of segments forming the address space EAX in question.

FIG. 10 illustrates the format of a 64-bit descriptor AA64 enabling absolute addressing in physical memory. This format is derived from the descriptor 4GB/ITS64 shown in FIG. 4, corresponding to the segments of type 4 GB, in which the field XTAG =01. The field MBZ, formed of bites 6–24 (including the field SHR, which is not significant in this case) is set at a value equal to zero. The first eight most significant bits of the absolute address are arranged in the field formed of bits 24–31, while the least significant bits of the same absolute address are arranged in the field formed by the second word of the descriptor, that is, bits 32–63. As a result, the absolute addressing capacity is 2**40 bytes, or 1024 gigabytes.

Absolute addressing based on a 32-bit descriptor is not possible directly. A change of format operation must be performed first, to change to a 64-bit format; this operation will be described hereinafter.

Execution Modes for the Processes

The various versions of memory addressing introduced above are used entirely in the three process execution modes used in the information processing system of the context of the invention:

The first mode, "32 mode", uses 32-bit addressing.
The second mode, "64 mode", uses 64-bit addressing.
The third mode, "32/64 mode" uses double addressing for certain segments, and under the particular conditions described in detail hereinafter.

The first mode is derived from that used by the present applicant in its "DPS7" system. In particular, the process control block PCB corresponding directly to this 32 mode has substantially the same format as that described in U.S. Pat. No. 4,297,743. It will be recalled that the block PCB includes the memory zones corresponding to the eight base registers (32 bits per register), 16 general registers (32 bits per register), four scientific calculation registers (64 bits per register), one memorization or saving zone of the register IC (instruction counter) (32 bits), one memorization zone of the register T (top of the stack) (32 bits), and one memorization zone of the STR register (statute register) (8 bits). Nevertheless, absolute addressing is no longer authorized for 32 bits, but may be obtained after changing the process mode to the 64 or 32/64 mode. In effect, the code type TAG =01 is used for expanding the virtual address in the 32/64 mode.

Thus the first mode of execution, 32 mode, is capable of managing direct IRS 32 descriptors (TAG=00), indirect descriptors (TAG=10), and default descriptors (TAG=11) for access to the only segments of the space EAPCB. Additionally, the process has the possibility of managing new pointers in memory for the other modes and of transferring the data from or to the other segments of the virtual memory with the aid of a particular instruction, called XMOVE.

The process execution mode called 64 mode is equivalent to 32 mode, but adapted to the new memory domain DX and to its 64-bit addressing. The list of instructions is close to that for 32 mode but is supplemented with new instructions concerning the following:

the activation test of the new 64-bit environment,
the test of the current operating mode,
the XMOVE operation, the instructions corresponding to the new page and segment descriptors and to the management of the memory allocation tables.

To enable execution by the 64 mode, the process control block PCB has a new format shown in FIG. 11, i.e., FIGS. 11(1) and 11(2), and briefly described below.

With respect to the address of the initial byte of the block PCB (reference byte 0), the blocking includes memory zones reserved for the provisions of the process execution time (addresses −60 to 0); the zones occupying bytes −60 through −17 are optional. It will be noted that the numerals placed alongside the memory sites specify the offset in bytes relative to the reference site 0 of the control block PCB. Beginning at byte 0 to byte 15, four main process words PMW.0 through PMW.3 are stored in memory. The word PMW.0 occupies bytes 0-3 and has four fields, each of one byte: a capacity field CAP, a priority field PRI, a process execution state field EXE (for example "waiting", "ready", etc), and an execution field DEXT. Details on the contents of the four fields of the word PMW.0 are provided in U.S. Pat. No. 4,297,743.

The main process word PMW.1 is stored in memory in bytes 4-7. The state byte STR enables storage in memory of the state register STR of the system. The following byte (encoded MBZ) is set at zero. The next field ES, of two bits, indicates the process execution mode, depending on the value of its contents, as follows:

ES = 00, 32 mode
ES = 01, 32/64 mode
ES = 10, 64 mode
ES = 11, illegal PCB.

The contents of the field ES are capable of being modified by software prior to the execution of a process starting instruction (START), thus making it possible to change the process execution mode, or to do so with the aid of specialized instructions.

The main process word PMW.2 is used to communicate complementary information relating to the process state, while the word PMW.3 includes two significant fields, the field DCN (bits 0-7) concerning the rights of the process to execute certain specific instructions, and the field CPSM (bits 16-31) concerning a mask of processes authorized to execute the process.

The block PCB then includes the two address space words ASW.0/1 already introduced (which furnish the address of the arrays describing the segment tables STWA), and then a sub-block comprising bytes 24-51, which is significant when ES = 00 or 01 and comprises the exception word EXW, the stack word SKW memorizing the contents of the top of stack register T used for the procedure calls, the word ICW memorizing the contents of the instruction counter IC used to learn the address of the instruction to be executed, the word CSW memorizing the contents of the register CSR used to learn the ordinal number or identification of the current address space EAC, and finally, the three stack base words SBW.1 through SBW.3. These words include the respective segmented addresses of the first bytes of the stack segments for rings (0), (1) and (2).

Bytes 52-83 correspond to eight words of a base register memorization zone ZMRB (which are not significant in the mode where ES = 1 and ES = 10). These base registers have a 32-bit format analogous to that described for the descriptor IT 32 in conjunction with FIG. 8.

Bytes 84-147 corresponding to 16 words of a general register memorization zone ZMRG, while bytes 148-179 correspond to eight words of a scientific register memorization zone ZMRS.

Bytes 180-255 correspond to a sub-block that is not significant when ES = 00; the first word of this sub-block includes a first field BREM of a byte used for memorizing the contents of a register BREM (which stands for mask of extended base registers) usable in the 32/64 mode, hence when ES = 01, and a second field MBZ, set at 0. Bytes 184-247 correspond to the extended base register memorization zone EXZMRB (eight double words). These base registers have 64-bit formats analogous to the formats described for the descriptors ITS 64 (TAG = 01 and TAG < > 01) in conjunction with FIGS. 4, 6 and 10. Bytes 248-255 correspond to a double main process word EXPMW.2. Bytes 256-303 are not significant except in 64 mode (EX = 10) and they include one double word EXICW memorized in the contents of the extended instruction counter, one double word EXKW memorizing the contents of the extended top of stack register T, the three double words EXSCW.0-EXSBW.2, and the double word EXEXW.

Finally, block PCB in the new format has a zone of eight exception-related memorization words ZMRE (bytes 304-352), one zone (bytes 336-367) of four double address space words ASDW.0-ASDW.3 (see FIG. 7) for segments of types 64K/4MB, and one zone (bytes 368-399) of four double address space words ASDW.4-ASDW.7 for the segments of type 4 GB.

The process execution mode called 32/64 mode was designed for better utilization of segments of the 64K/4MB type and for enabling bridges between the two memory domains DL and DX, in particular enabling migration to 64-bit addressing.

32/64 mode utilizes the contents of the register BREM, which makes it possible to memorize in one byte the length of the eight descriptors ITS contains in the base registers (one bit BREMi per base register BRi, where i is between 0 and 7). The "0" value of the contents of the bit BREMi indicates that the corresponding base register BRi contains a descriptor ITS having a 32-bit format, while the value "1" of the bit BREMi indicates that this same base register BRi contains a descriptor ITS having a 64-bit format.

The instructions on arranging and loading the base register use the contents of the register BREM to decide on the possible conversions (32→64 or 64→32). More precisely, if BREMi = 1, the base register BRi includes a 64-bit virtual address, and the address expansion is done based on the contents of the fields SHR, ASN, STN, STE and SRA. Conversely, if BREMi = 0, the base register BRi includes a 32-bit virtual address. If the code TAG contained in the register BRi differs from 01, then the addressing expansion is performed for 32 bits; in the opposite case (TAG in BRi = 01), a dynamic expansion of address format is performed taking into account the contents of the fields SHR and ASN of the current space register CSR (the field TAG of the new 64-bit descriptor ITS thus obtained is automatically set to 00).

Moreover, certain address expansions are performed based on the contents of base registers BR having a code TAG = 10. There are two possible cases:

a code TAG = 10 in a base register BRi, of which BREMi = 0 (32-bit address) corresponds to a data descriptor ITS 32 with TAG = 00;

a code TAG = 10 in a data descriptor ITS accessed in memory and associated with a BREMi = 0 must be suffixed with the contents of the register CSR when the contents of the original base register that was used for the address expansion has a code TAG=01.

Finally, when the code TAG of a data descriptor ITS shifted in memory from a register in which BREMi=0 (32-bit register) differs from 10 (or 11), then this descriptor is suffixed with the contents of the register CSR, if its code TAG=01.

Thus a process executed in the 32/64 mode can process 32-bit and 64-bit addresses. To enable these changes in address format and to change from a 32-bit environment to a 64-bit environment, two particular instructions have been created:

the instruction XLBD loads two words (eight bytes) of the address X into the base register BRi, and places the value 1 in the BREMi;

the instruction XSTB arranges the contents of the base register BRi into two words (eight bytes) based on the address X after a format expansion from 32 to 64 bits, if BREMi=0 and if the code TAG=01.

Call Procedure Mechanisms

Generally, information processing systems make wide use of operations known as procedure calls, by which a process executing a procedure is capable of calling another procedure APE for execution, and then resuming its own execution by return to the initial procedure APT. This procedure call concept is highly advantageous for the use of modular programs. The present applicant, in U.S. Pat. No. 4,297,743, has described a method and an apparatus that use a stack memory structure well adapted to this type of procedure call operation.

A stack is a particular memory segment comprising contiguous elements access to which is achieved by the LIFO (last in, first out) system. A stack element is created upon each procedure call and is used to memorize the information enabling the return to the calling process. A recapitulative call state is thus obtained in the stack.

In the operating system, the location of the active stack element is retained in the base memory BRO, while the location subsequently available is retained in a special register T, or top of stack register. Moreover, transmission of certain parameters is effected via a base register selected by the programmer.

A procedure call begins with the execution of an instruction PRSK (preparation of the stack), the effect of which is to save in the stack the contents of the register STR and to furnish the user-programmer the pointer of a zone capable of receiving the parameters and in which the information to be transmitted to the called procedure will be loaded. The procedure call is then completed with the execution of the instruction ENT (entry to the procedure) by the following steps:

ring control (in the event that it is necessary to change rings, a "gate" subprocedure is then executed), saving of the register contents of the instruction counter IC, loading of the base register BRO (pointing to the parameters), determination of the entry point of the procedure by a procedure descriptor, the address of which is given in the instruction ENT, loading of a pointer designating the linking data in a predetermined base register, for example the register BR7, entry into the new procedure by loading the new ring number, as applicable, and the address of the point of entry into the register for the instruction counter IC.

A zone of the current stack element, or working zone ZT, is also at the disposal of the called procedure, by storing local variables in memory. The return is effected with the instruction EXIT (exit from the procedure), from the contents of the stack memorization zones relating to the registers and the instruction counter IC.

For security reasons, a stack structure via ring numbers is provided. For each stack the particular format of an element will depend on the mode of execution of the calling process. FIG. 12 schematically illustrates the format of a stack element used in the 32/64 mode.

Turning to FIG. 12, the 32/64-mode stack element comprises a 32-bit width in three main zones: the working zone ZT, the information saving or memorizing zone ZS (prior to calling the new procedure) and the communication zone ZC (in which the information necessary for executing the called procedure are arranged). These three zones are created by the instruction PRSK; the first byte of the zone ZC is designated by the base register BRO.

The first word of the zone ZS comprising the saving zone mask or SAM, which is in the following form:

a "format" field with four bits, in the present case, and having contents of 0100, an eight-bit zone BR comprising a designation mask for the eight base register BR0-BR7 (with a view to storing them in memory), a 16-bit zone GR, comprising a designation mask for the 16 general registers GR0-GR15, and a four-bit zone SR comprising a designation mask for four scientific registers SR0-SR3.

The second word is reserved for saving the register CSR, while the third word is reserved for saving the register BREM. Next comes the base register saving zone BRSA (two words per register, with setting to zero of the second word when BREMi=0), and then the saving zone ORSA of the registers. The next-to-last word is used for saving the state register STR (first byte), and the possible number of the partial memory extension in which the current procedure of the calling process is operating. Finally, the last word PTV of the saving zone ZS contains the preceding value of the register T, or in other words the value of the register T at the beginning of the instruction PRSK.

The communication zone ZC the entry of which is given by the pointer contained in the base register BRO begins with the word PSA which contains the pointer of the word SAM. Next comes the word ICC, which contains the address of the instruction following the instruction ENT. The contents of the field NBP (number of bytes of the parameter zone) of the instruction PRSK is arranged in the field NBP of the stack element. The communication zone ends with the parameter zone PARAM, the end of which is bounded by the top of stack byte T. The register T is updated after each creation of a stack element.

In the case of execution in 32 mode, the stack format is close to that described above with reference to FIG. 12, with the following modifications:

the contents of the "format" field of the word SAM is set to 0000, the words CSR and BREM are eliminated, and saving of the contents of the base register is performed for a single word, instead of two.

In the case of execution in 64 mode, the stack format is close to that described above for the 32/64 mode in conjunction with FIG. 12, with the following modifications:

the contents of the "format" field of the word SAM is set to 1000, the words CSR and BREM are eliminated, and the saving zones of the base registers, that is the zones PTV, PSA and ICC, have a double word as a dimension. Hence the address of the first byte of the zone PARAM is obtained by a shift of 20 bytes, from the address pinpointed by the contents of the register BR0.

Access to the various procedures employed in the content of call mechanisms is performed by way of procedure address descriptors, known as procedure descriptors PD. It is understood that the formats of the procedure descriptors depend on the execution mode of the process.

If the execution is done in the 32 or 32/64 mode, the mode of the procedure descriptor, or PD 32, matches that shown in FIG. 13. The first word M.0 includes the field TAG (bits 0 and 1), the field EPRN (bits 3 and 4) equivalent to the field RING (ring number) and to the segmented address field (SEG, SRA) of the called procedure (bits 4-31), in the case where TAG<>0. The field SEG enables identification of a segment number and has the same significance as the set of fields STN and STE of descriptors in FIGS. 6 and 8. Similarly, the field SRA defines the offset in the segment defined by SEG. Optionally, a second 32-bit word M.1 contains the extension parameters EXPARAM. More precisely:

where TAG=00 (direct descriptor), the procedure descriptor is limited to one word, and the segmented address corresponds to that of the point of entry of the procedure;

where TAG=01 (extended descriptor), the descriptor includes two words; the segmented address corresponds to that of the point of entry of the procedure; moreover, the contents of the second word are loaded into the base register BR7 upon entry of the procedure;

where TAG=10 (descriptor CASD), the format of the change of address space descriptor CASD is shown in FIG. 14.

The first word M.0 of the descriptor CASD includes, in addition to the field TAG set at 10, a field NXM (bits 2 and 3) defining the mode of execution of the called procedure, and the field PDA1 (SEG, SRA) (bits 4-31) of the segmented address of the descriptor of the called procedure. The second word M.1 includes a six-bit zone set to zero and an additional field PDA2 (SHR, ASN) (bits 38-63) of the segmented address of the descriptor of the called procedure.

If the execution is done in the 64 mode, the format of the procedure descriptor, or PD 64, is as shown in FIG. 15. The format has at least two words (M.0 and M.1) and optionally has two extension words (M.2 and M.3). The structure of the words M.0 and M.1 is similar to that already described for the data descriptors ITS 64 with 64-bit addressing. Moreover, the words M.2 and M.3 include extension parameters EXPARAM1/2.

where TAG=00 (or TAG=01 and XTAG=00) (direct descriptor), the dimension of the descriptor is two words, and the segmented address is that of the entry point of the procedure.

where TAG=10 (or TAG=01 and XTAG=10) (extended descriptor), the dimension of the descriptor is four words, and the segmented address is that of the entry point to the procedure and the contents of the words M.2 and M.3 are loaded into the base register BR7.

where TAG=11 (or TAG=01 and XTAG<>(00 or 10)), the result is a branch to the exception procedures provided by the system.

Generally, a procedure descriptor incorporated into an unprotected segment can be placed in any segment compatible with the addressing used and the process execution mode:

in the 32 mode, the procedure descriptor is placed in a segment of the space 64K/4MB accessible via SHR and ASN, which are equal to zero. It may also be placed in any segment of the spaces 64K/4MB (EAX), if it is referenced by the intermediary of a descriptor CASD, which in turn is located in a segment of the space 64K/4MB that is accessible by SHR and ASN, which are equal to zero.

in the 64 mode, the procedure descriptor may be placed in any type of segment, as long as the process is authorized access to this segment;

in the 32/64 mode, the procedure descriptor may be placed in any segment of the 64K/4MB or 4GB type, if it is referenced by a 64-bit virtual address (BREMi=1). It may be placed in any segment of the 64K/4MB type if it is referenced via a CASD descriptor. It may be directly referenceable, if the segment 64K/4MB is accessible with SHR and ASN=0, or with the contents of the register CSR.

Regardless of the mode of execution, the procedure call mechanism fulfills the following four main functions:

a) verification of the rite of access, that is, of the rite of the caller (APT) to call the callee (APE) as a function of the values of the respective rings, b) determination of the new ring number, c) updating of the stack and stack register, d) branching at the point of entry to the procedure.

In the 32 and 32/64 mode, the call and return mechanisms differ slightly, depending on whether an automatic change of execution mode is necessary and/or on the presence of a procedure descriptor that is not directly accessible via a 32-bit virtual address.

For the remainder of this disclosure, the following definitions will be used:

Address space POB (EAPCB): Set of segments that are directly accessible when the process is executed in 32 mode.

Current address space (EAO): Set of segments belonging to the address space EAX that is accessible by the intermediary of the contents of the register CSR. If the register CSR is at zero, the space EAPCB and the current address space EAC represent the same set of segments.

New address space (NEA): Set of segments belonging to the address space accessible by the intermediary of the second word of a descriptor CASD.

In the course of execution of a process, the invention provides three cases for dynamic change of execution mode at the time of a procedure call and a corresponding return. These cases, DYN1, DYN2 and DYN3, are described with reference to FIGS. 18, 19 and 20, respectively.

First, the various formats of the register of the instruction counter IC should be introduced quickly. More particularly, FIG. 16 illustrates the format of the corresponding register IC for 64 mode, where TAG=00. In this case, the format (comprising a double word) is similar to that described for the descriptors 64K/4MB/ITS64 (shown in FIG. 6), with equivalence between the field RING (shown in FIG. 6) and the field PRN (shown in FIG. 16). Where TAG=10, the format of the register IC is analogous to that described for the 4GB/ITS64 descriptors (shown in FIG. 4). In modes 32 and 32/64, the register IC comprises a single word, the format of which is analogous to that described for the descriptors 64K/4MB/ITS32 (shown in FIG. 8), with equivalence between the field EAR (shown in FIG. 8) and the field PRN of the register IC. In 32 mode, the field TAG is always equal to 00. Contrarily, in 32/64 mode, the field TAG may assume the value 00 (the register IC contains the virtual address of the next instruction to be executed), or the value 01 (the contents of the instruction register must be concatenated with the contents of the register CSR to form the virtual address of the next instruction to be executed).

Generally, a procedure call mechanism in a given address space EA, from a calling procedure APT to a called procedure APE, and using a procedure descriptor PD, is performed along the basic outline shown in FIG. 17. The use of a procedure descriptor in a call mechanism makes it possible to provide the necessary coherence controls for assuring the integrity of the system without difficulty. Moreover, a software convention that uses the mechanism of indirection makes it possible both to have a static and a high-powered dynamic resolution of references external to the program to be run (this indirection is indicated in FIGS. 17-20 with the asterisk following the code ENT).

To do this, the compiler groups the references to be resolved into a table, called link editing section LKS. The procedure calls external to the instruction code CODE use an indirection to reach the descriptor PD of the called procedure APE. The advantages of this method are numerous:

It enables independence of the code and references external to the program.

It enables dynamic link editing with code sharing by using local search rules (each program must have one subsection of private links).

It enables dynamic link editing in machines with cache memory for instructions, without emptying the cache memory after resolution of the external reference.

Finally, resolution of an external reference is done only a single time, regardless of the number of uses in the code.

In a first approximation, the compiler produces two objects. The first contains the object code CODE (set of instructions to be executed), and the second contains a link editing section LKS, which contains a word by external reference to be solved, plus constants used by the code. Moreover, an appended table contains the symbolic names of the external references (for the static or dynamic link editing). The link editing section LKS and the code CODE may be grouped in the same segment for reasons of segment economy. Similarly, a plurality of compilation units may also be grouped together.

Upon execution, the instruction ENT (ENTER) looks for the shift X with respect to the base BR7, or in other words looks directly for a procedure descriptor PD, if there is no indirection at this level (this case is shown in FIG. 17) or another address descriptor, if there is an indirection (for example in the cases shown in FIGS. 18, 19 and 20). The procedure descriptor PD is read after the access controls (rankings), to obtain the address of the point of entry in the called procedure and the value to be arranged in the base register BR7.

Thus the procedure call mechanism puts the two instructions PRSK and ENT into play. The first instruction PRSK prepares the stack zone, which serves to save the context (set of instantaneous contents of the registers assigned to the process) and the passage of the parameters. The argument of this instruction is a mask SAM designating the registers to save, the size of the parameter zone and the number of the register that will, at the end of instruction, contain an address making it possible to arrange the parameters in the reserved zones. The second instruction ENT effects the "transfer of control", that is, the passage to a new code sequence of instructions to be executed. The fact that the preparation of the call is separated from the call itself makes it possible to free a register to perform the sequence of passage of parameters.

It should be noted that the register that pinpoints the context is the base register BR0, for the context of the calling procedure. This is the register mentioned in the instruction PRSK for the new context, until the execution of the call instruction ENT. Since the base register BR0 is systematically saved, it is possible to ascend the chain of calls.

Upon the return, the instruction EXIT takes the context off the stack and reinitializes the various registers with the saved values.

Case #1 (DYN1): from 32 mode to 32/64 mode.

The passage from 32 mode to the 32/64 mode is done simply by inserting a change of address space descriptor CASD in the access route to the procedure descriptor PD. The two words of the descriptor CASD form a 64-bit address, enabling the reading of the procedure descriptor PD. Since the resolution of the external references is done under the control of the operating system, without modification of the format of the table LKS or of the procedure descriptor, the insertion of the descriptor CASD is totally transparent to the old programs. The second word of the descriptor CASD (which is identical in form to that of the register CSR) indicates which will be the new address space NEA that will be activated as the space EAC. It is unnecessary for the code or the link editing section for the called procedure to be in the space EAC. The fact that all or part of it is placed in the space EAC depends on the use one wishes to make of the novel possibilities offered by the invention (extension of the virtual space, absolute addressing, access to the space DX, and so forth).

Thus the dynamic change takes place at the time of a call procedure (CALL) for example with the execution of an instruction ENT, in the case where the first descriptor leading to the called procedure APE is of the CASD type. This access is achieved in the manner shown in FIG. 18. The instruction counter register IC has a 32-bit format, with the field TAG set at 00. In the space EAPCB, the register IC pinpoints the address of an entry ENT in the instruction code table (table CODE). The instruction ENT contains an address field, known as the significant address directory of an indirection that calls the base register BR7 (see U.S. Pat. Nos. 4,385,352 and 4,297,743). The expansion of the address directory in combination with the contents of the base register BR7 pinpoints an entry in the link table (LKS), the contents of which enable pinpointing the real procedure descriptor PD of the type PD32 located in the new address space NEA. The field TAG of the descriptor PD is set to the value 01, which signifies a double-word format, and the segmented address fields of the descriptor PD are loaded with the contents of the corresponding fields of the descriptor CASD. Hence the system will, in the classical manner, utilize the first word of the descriptor PD to determine, in the table CODE of the new address space NEA, the entry of the instruction code of the called procedure APE and will use the second word of the descriptor PD to determine the corresponding entry in the link table LKS, and will find the information necessary for executing the called procedure APE.

Additionally, the field TAG of the register IC is loaded with the contents of the field of bits 2 and 3 of the first word of the descriptor CASD, which then becomes a direct descriptor (TAG=00). Finally, the process execution mode changes to the 32/64 mode (ES=01).

At the time of execution of a return instruction EXIT, the dynamic change to the 32/64 mode will take place, with removal of the zone ZS from the stack, if the calling procedure APT was executable in that mode, or in other words if the "format" field (the first four bits) of the word SAM of the corresponding stack element is equal to 0100.

Case #2 (DYN2): from 32/64 mode to 32/64 mode (pseudo-change).

When a process is executed in the 32/64 mode, the dynamic mode change mechanism is used to change the current address space EAC. In this case, the dynamic change mechanism remains close to that described above; it is illustrated in FIG. 19. The descriptor CASD is used to pinpoint the procedure descriptor PD in the new address space. Moreover, the field TAG of the register IC is loaded with the contents of the field of bits 2 and 3 of the first word of the descriptor CASD. Finally, the register CSR is loaded with the contents of the second word of the descriptor CASD (the preceding contents having been saved in the stack). It is understood that the mode of execution of the process remains the 32/64 mode.

Case #3 (DYN3): from 32/64 mode to 32 mode.

When a process is run in the 32/64 mode, the dynamic change is authorized by the instruction ENT. This change takes place when the field of bits 2 and 3 of a descriptor CAD="10". The corresponding dynamic change mechanism is illustrated in FIG. 20.

Once again, the descriptor CASD is used to select the procedure descriptor PD. Additionally, the field TAG of the register IC is set at 00, and the register CSR is loaded with the contents of the second word of the descriptor CASD (the preceding contents having been saved in the stack). Finally, the process execution mode changes to the 32 mode.

When the instruction EXIT is executed, the dynamic change will take place depending on the value of the first four bits of the word SAM of the stack (0000=32 mode, or 0100=32/64 mode).

Thus the dynamic change of execution mode gives the user great flexibility with respect to existing programs written in a 32-bit format. These programs can be located (including the code) with the 64-bit memory domain DX. They can also call procedures and other programs and/or subroutines that are written in a 64-bit format and can be run in the 32/64 mode. In this latter mode of execution, the programs can manage both types of addressing, 32-bit and 64-bit addressing.

The invention is not limited to the single method described here but instead relates equally to any information processing system including hardware and software means for employing the method described above, in all its variations. The system according to the invention includes the processor subsystem 100 structured around one or more central processors CPU 106 and a central memory MMU 102, each processor including microprogrammed means to perform the management of the central memory 102 and controllers IOC 108 for input/output with respect to the peripheral subsystem 104, in particular to mass memory means having sufficient capacity for virtual addressing, and software means, in particular a set of programs included under the name of operating system, to enable the employment of the method according to the invention, in combination with the microprogrammed means. In a practical fashion, the specific operations described in the context of the invention are achieved by software and/or microprogramming and/or logic circuits.

What is claimed is:

1. A method of operating a memory in an information processing system of the virtual addressing type, said method comprising the steps of:
    organizing a first memory domain DX of a first address size NX having NX bits usable to logically address memory locations of said first memory domain,
    defining in the memory domain DX a plurality of interchangeable address spaces EAX of identical structure of a second address size NL having NL bits usable to logically address memory locations of said interchangeable address spaces EAX, where NL is lower than NX,
    constructing a first addressing format FX1 of the size NX for access to the spaces EAX by extension of a second addressing format FL of the size NL used for relative addressing of memory locations in said interchangeable address spaces EAX by means of a complementary zone containing at least one field intended to receive an identifier of the corresponding interchangeable address spaces EAX,
    assigning one of the interchangeable address spaces EAX as a current address space EAC temporarily and interchangeably to a second memory domain DL using the second addressing format FL and selecting a bit pattern of said second addressing format FL for discriminating between the first addressing format FX1 and the second addressing format FL to control access to the said current address space EAC in said second memory domain DL, and
    storing in a register CSR the identifier of the interchangeable address space EAX assigned as current address space EAC.

2. The method of claim 1, characterized in that the memory domain DL includes a permanent address space EAPCB identical in structure to the said interchangeable address spaces EAX, the permanent address space EAPCB being markable in the memory domain DX by an identifier having a value equal to zero.

3. The method of claim 2, further comprising the steps of:
- utilizing procedure descriptions PD of identical basic structure for the address spaces of size NL, the spaces EAX and as applicable the permanent space EAPCB,
- defining descriptors of a change of address space (CASD), identical in basic structure to that of the procedure descriptors PD; and
- beginning with a process that can be executed in a given address space, authorizing a callup of a procedure APE that can be executed in another address space, via a descriptor of the CASD type.

4. The method of claim 3, characterized in that the CASD descriptors include a field intended to receive the identifier of another address space NEA containing a called procedure APE and the called procedure including a pointer in said another address space NEA.

5. The method of claim 4, incorporating a first and a second process execution mode, said second process execution mode (32/64 mode) supporting both address sizes NX and NL, both execution modes being automatically switchable from one to the other upon a procedure callup by identification in a procedure descriptor of a code type characteristic of a CASD descriptor.

6. The method of claim 1, characterized in that the address spaces of the first and second memory domains are of the segmented type, optionally having a plurality of sizes and/or sharable by a plurality of programmed processes.

7. The method of claim 1, characterized in that a plurality of segments accessible from a different addressing format FX2 of size NX is defined in the first memory domain DX.

8. The method of claim 7, characterized in that the format FX2 incorporates a version AA64 enabling absolute addressing in a physical memory of the information processing system.

9. The method of claim 1, incorporating a first process execution mode (32/64 mode) supporting both address sizes NX and NL.

10. The method of claim 9 including a second process execution mode (32 mode) supporting the second addressing format NL, both process executing modes (the 32 mode and the 32/64 mode) being switchable from one to the other, either automatically by dynamic change or by programming.

11. The method of claim 11, including a process for executing elementary instructions, which uses base registers as address registers of the information processing system further comprising the steps of:
- defining two sets of base registers Bri of address size NL and NX
- in a memory zone BREM comprising a set of bits BREMi organizing a mark for the contents of each bit BREMi which is representative of the address size NL and NX of an address loaded into or drawn from the corresponding register BRi;
- simultaneously with the loading of the drawing of the said address, executing a compatibility verification of the address loaded or drawn by checking the corresponding bit BREMi, and if applicable, effecting an automatic address reduction or extension, with change, as a consequence, of the corresponding bit BREMi.

* * * * *

UNITED STATES PATENT AND TRADEMARK OFFICE
CERTIFICATE OF CORRECTION

PATENT NO. : 5,129,070

DATED : July 7, 1992

INVENTOR(S) : Michel Dorotte

It is certified that error appears in the above-identified patent and that said Letters Patent is hereby corrected as shown below:

Col. 22, line 16 (Claim 11, line 1) "claim 11" should be --claim 1--.

Col. 22, line 20 (Claim 11, line 5) "Bri" should be --BRi--.

Signed and Sealed this

Twenty-third Day of November, 1993

Attest:

BRUCE LEHMAN

Attesting Officer · Commissioner of Patents and Trademarks